United States Patent [19]

Eisenberg

[11] 4,401,452
[45] Aug. 30, 1983

[54] METHOD OF AND APPARATUS FOR CONTROLLING THE BREAKAGE OF GLASS FIBERS

[75] Inventor: Arnold J. Eisenberg, Granville, Ohio

[73] Assignee: Owens-Corning Fiberglas Corporation, Toledo, Ohio

[21] Appl. No.: 361,179

[22] Filed: Mar. 24, 1982

Related U.S. Application Data

[63] Continuation of Ser. No. 219,409, Dec. 22, 1980, abandoned.

[51] Int. Cl.³ .......................................... C03B 37/025
[52] U.S. Cl. ................................... 65/2; 65/10.1; 65/12; 65/29; 356/73.1
[58] Field of Search .................. 65/2, 10.1, 12, 29, 65/160; 356/73.1

[56] References Cited

U.S. PATENT DOCUMENTS

| | | | |
|---|---|---|---|
| 3,905,790 | 9/1975 | Strickland | 65/2 |
| 4,130,406 | 12/1978 | Wakasa et al. | 65/2 |
| 4,149,865 | 4/1979 | Coggin et al. | 65/1 |

Primary Examiner—Robert L. Lindsay, Jr.
Attorney, Agent, or Firm—Ronald C. Hudgens; Patrick P. Pacella; Ronald E. Champion

[57] ABSTRACT

A method of and apparatus for controlling the breakage of glass fibers comprising: feeding a supply of molten glass through an orificed wall to form glass streams; attenuating the glass streams to form a plurality of glass fibers; gathering the glass fibers into glass strands; forming the glass strands into a wound package; determining when a break has occurred in the fibers; determining the location of such break; and positioning a stream of fluid at the orificed wall at the location of the break to inhibit further breakage of fibers that are adjacent to the location of the break.

9 Claims, 4 Drawing Figures

METHOD OF AND APPARATUS FOR CONTROLLING THE BREAKAGE OF GLASS FIBERS

This is a continuation of application Ser. No. 219,409, filed Dec. 22, 1980, now abandoned.

BACKGROUND OF THE INVENTION

This invention relates to the production of continuous glass fibers, e.g., fibers made by melting particulate batch ingredients or minerals, including basalt and the like, and, more particularly, to a method of and apparatus for controlling the breakage of glass fibers during the fiber forming process.

It is well known in the art that continuous glass fibers can be produced by attenuating a plurality of streams of molten glass into fibers, collecting the fibers into a strand and winding the strand into a package for subsequent use in manufacturing various products. The molten glass flows from a furnace, through a forehearth, into a feeder or bushing which has a plurality of orifices formed therein. The molten glass flows from the orifices as streams which are pulled downwardly at a high rate of speed for attenuation into fibers. A plurality of the attenuated fibers are then gathered together into a strand, coated with a sizing and wound onto a collection tube on a winder collet.

One of the major problems in the production of continuous fibers from bushings having tipless orifice plates, such as the bushings disclosed in Strickland, U.S. Pat. No. 3,905,790, is the tendency of the plate to completely flood with molten glass whenever the process is interrupted. If a tipless orifice plate becomes flooded, it will not clear itself or achieve filament separation to allow a restart of the process without the application of considerable time and effort by an operator skilled in the technique. Generally, the length of time required to restart a tipless bushing process is proportional to the unattended hanging time of the bushing after a break. Early detection of a break by the operator allows him to maintain filament separation and restart the process before a major flood can develop.

Therefore, it is an object of the present invention to provide a method of and apparatus for controlling the flooding that occurs on a bushing when a break occurs in the fibers break during the attenuation process.

SUMMARY OF THE INVENTION

In accordance with the present invention there is provided a method of controlling the breakage of glass fibers, such method comprising the steps of: feeding a supply of molten glass through an orificed wall to form glass streams; attenuating the glass streams to form a plurality of glass fibers; gathering the glass fibers into glass strands; forming the glass strands into a wound package; determining when a break has occurred in the fibers; determining the location of such break; and positioning a stream of fluid at the orificed wall at the location of the break to inhibit further breakage of fibers that are adjacent to the location of the break.

In addition, the present invention also provides an apparatus for controlling the breakage of glass fibers comprising: a feeder for holding a molten body of thermoplastic material, such feeder having an orificed wall for emitting a plurality of streams of the material; a rotary collector for attenuating the streams into continuous fibers and for winding the fibers into a package; a gathering device located between the feeder and collector for gathering the fibers into a strand before being wound into the package; means for scanning the fibers near the orificed wall to determine if a break has occurred in the fibers and to determine the location of such break; and means responsive to the scanning means for directing a stream of fluid at the orificed wall at the location of the break to inhibit further breakage of fibers that are adjacent to the location of the break.

In the preferred embodiment, the present invention utilizes two video cameras that have been strategically positioned to scan the fibers near the bottom of the bushing, preferably within the range of ½ to 3 inches (1.27 to 7.62 centimeters) from the bottom thereof, to determine if a break has occurred in the fibers. By utilizing two sensors, the system pinpoints the break to a specific area of the bushing. A digital encoder or other suitable position determining means converts the position of each of the sensors into a useful signal that is processed by a controller to provide a signal to the positioning device associated with the nozzle that provides the jet of fluid. The positioning device controls the azimuth and elevation of the jet nozzle to direct the fluid at the area of the break. The jet of fluid retards the spreading of the incipient flood until the operator can tend the position, thus reducing the system downtime caused by the break. If desired, the system may actuate a visible and/or audible alarm when a break occurs to alert the operator to restart the bushing before a major flood develops. The present invention is outstanding adapted to retarding the flood on a tipless bushing; however, it may also be utilized with tipped bushings.

Other objectives, advantages and applications of the present invention will be made apparent by the following detailed description of the preferred embodiments of the invention.

DETAILED DESCRIPTION OF PREFERRED EMBODIMENTS

Figures 1, 2:
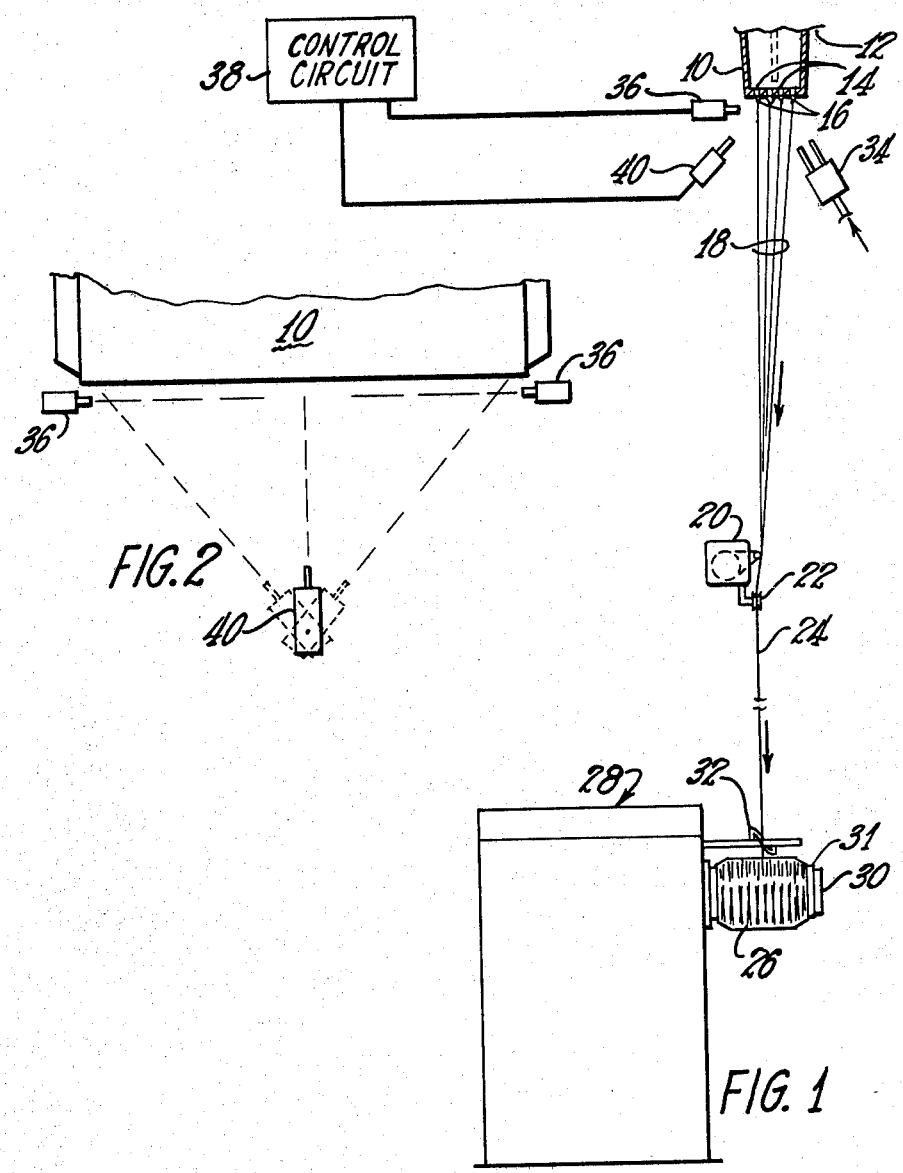
FIG. 1 is a diagrammatic view showing the incorporation of the present invention into a glass fiber producing apparatus.
FIG. 2 is a diagrammatic view showing the orientation of the two sensors and auxiliary cooling device of the present invention.

FIGS. 1 and 2 show the incorporation of the present invention into a typical glass fiber producing system. Bushing 10, which is connected to a forehearth 12 of a glass melting furnace, is provided with a plurality of orifices 14 from which cones 16 of molten glass are produced for the attenuation of glass fibers 18 for collection on winder 28. Fibers 18 are passed over sizing applicator 20 and also over gathering pulley 22 which gathers the fibers into strand 24 for winding into package 26 on winder 28.

Winder 28 has a winding collet 30 mounted for rotation about a horizontal axis for the collection of strand 24 into package 26 on a collection tube 31 which is placed over collet 30. A variable speed drive (not shown) within the housing of winder 28 rotates collet 30, and conventional winder speed controls (not shown)

modify the rotational speed of collet 30 during formation of the package 26. Strand traversing apparatus 32, such as a spiral wire traverse, is provided for distributing strand 24 along the length of collection tube 31. A fluid flow nozzle apparatus 34, such as that disclosed in Thompson, U.S. Pat. No. 4,202,680, which has been assigned to the assignee of the present invention, is positioned near the bottom of bushing 10 for controlling the fiber forming environment.

Figure 3:
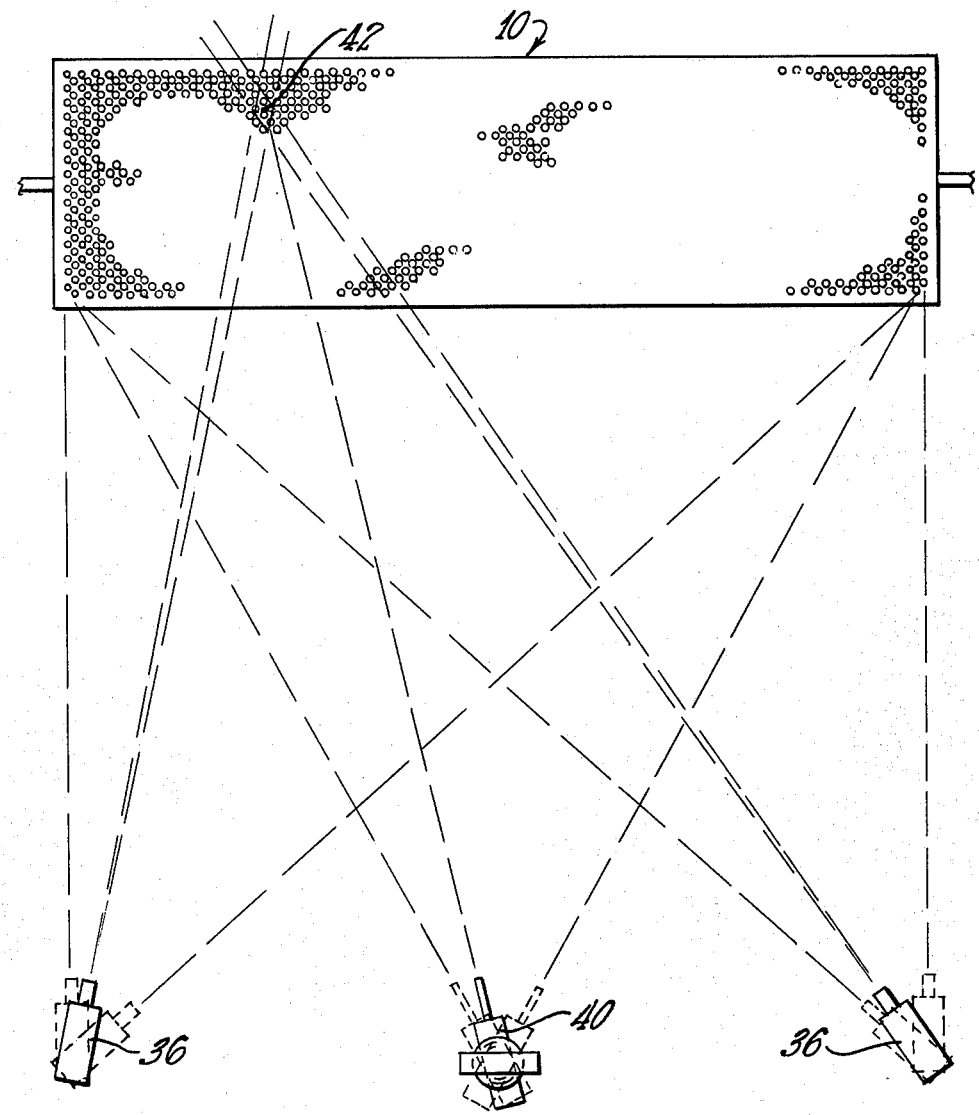
FIG. 3 is a diagrammatic plan view of the apparatus shown in FIG. 2 illustrating the angular range and operation of the sensors and auxiliary cooling device.

Referring to FIGS. 1, 2 and 3, two sensors 36 are positioned near opposite ends of bushing 10; sensors 36 may be pivotable or mounted on tracks or rails so that they are able to scan fibers 18. Preferably, each sensor 36 is a video camera that detects the presence or absence of fibers 18; however, other types of sensors may be used, such as light-emitting diodes and laser back-scatter devices. Sensors 36 cause their beams to sweep across the fan of fibers 18 in a plane parallel to and preferably ½ to 3 inches (1.27 to 7.62 centimeters) below bushing 10. If a break is detected by sensors 36, the intersection 42 of the two fields of view defines the area of the break. Each of sensors 36 provides signals to controller 38 to indicate whether a break has occurred and to indicate the position of the break. Controller 38 provides control signals to auxiliary cooling apparatus 40 which is positioned beneath bushing 10 to provide a narrow jet of fluid, such as air, water, or saturated water vapor, to the area of the break, i.e., intersection 42. Auxiliary cooling apparatus 40 is pivotable in both the horizontal and vertical directions so that its azimuth and elevation can be controlled to enable it to provide a jet of fluid to any point of bushing 10.

Figure 4:
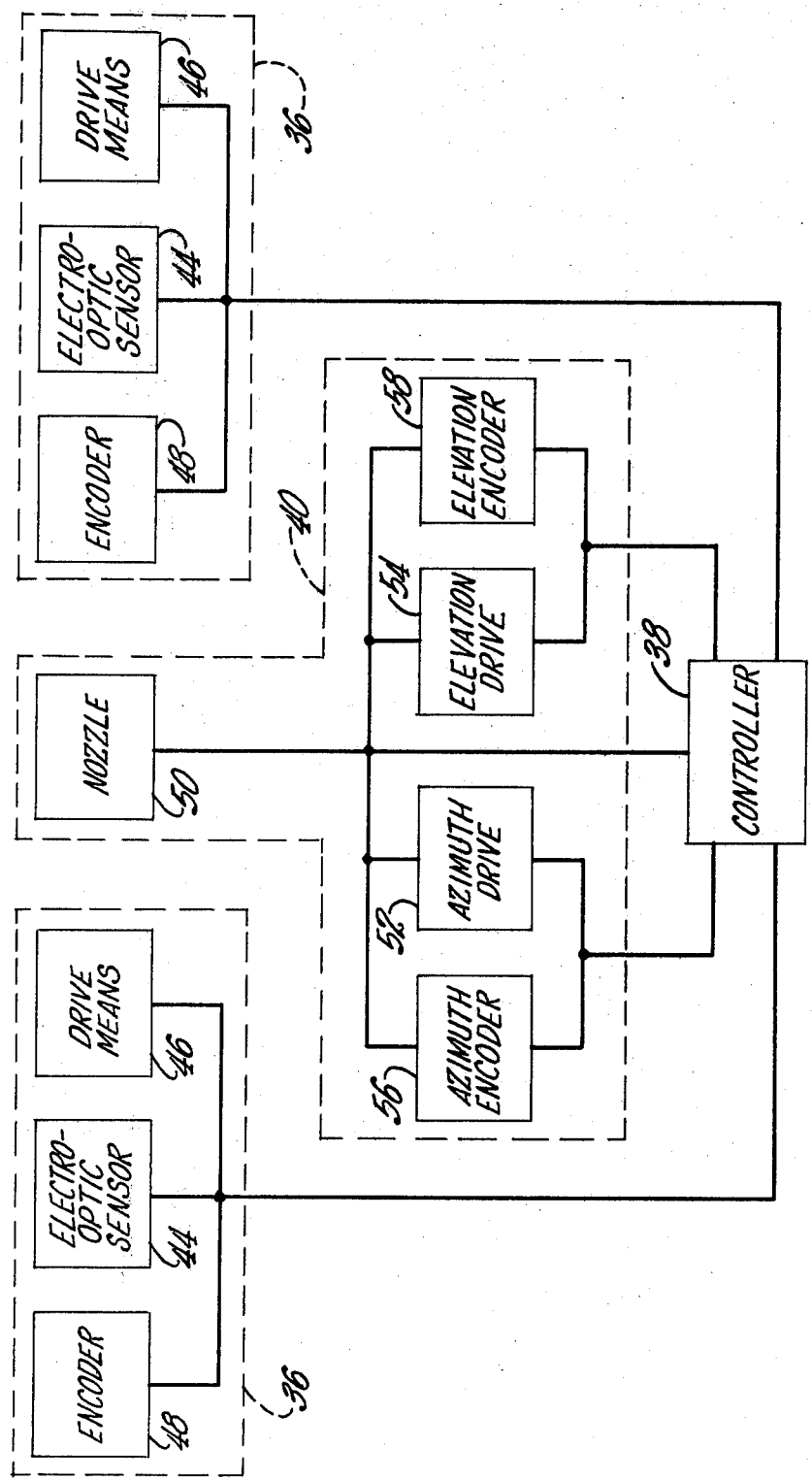
FIG. 4 is a schematic block diagram showing the control system of the present invention.

FIG. 4 shows the control system organization of sensors 36, auxiliary cooling apparatus 40 and controller 38. Each of sensors 36 consists of an electro-optic sensor 44 which is moved by drive means 46 to enable electro-optic sensor 44 to scan fibers 18. The position of the respective sensor is determined by an encoder 48, which may be a rotary digital encoder. Electro-optical sensor 44, drive means 46 and encoder 48 are connected to controller 38 which may be a microcomputer.

Auxiliary cooling apparatus 40 consists of a nozzle 50 which is actuated by controller 38, nozzle 50 is positioned by azimuth drive means 52 and elevation drive means 54 both of which are responsive to controller 38. Azimuth drive means 52 and elevation drive means 54 may be, for example, closed loop DC servo drives, stepping motors or rotary actuators. The position of nozzle 50 is determined by both the azimuth encoder 56 and elevation encoder 58 which are in electrical contact with controller 38.

Referring to FIGS. 1–4, the overall operation of the present invention is as follows. Electro-optic sensors 44 of sensors 36 continuously scan fibers 18 and provide signals to controller 38 that are indicative of the presence or absence of fibers 18. If the signal from one of sensors 36 is indicative of the absence of fibers thereby indicating that a break has occurred in fibers 18, controller 38 provides a control signal to drive means 46 to stop electro-optic sensor 44 at the position at which the break has been detected. Encoder 48 provides a digital signal to controller 38 that is indicative of the location of the break as detected by electro-optic sensor 44. The other electro-optic sensor 44 continues to scan fibers 18 until it also detects the break. Then, similarly, controller 38 also provides a control signal to the appropriate drive means 46 to stop electro-optic sensor 44 at the location of the detected break. The respective encoder 48 provides a digital signal to controller 38 indicative of the location of the second electro-optic sensor 44.

Controller 38 integrates the two location signals provided by encoders 48 to determine the coordinate location of the break and provides control signals to azimuth drive means 52 and elevation drive means 54 to position nozzle 50 such that the jet of fluid emitted therefrom is directed at the location of the break, for example, intersection 42. Azimuth encoder 56 and elevation encoder 58 provide the necessary feedback information to controller 38 to accurately position nozzle 50. When nozzle 50 has been appropriately positioned, controller 38 actuates nozzle 50 to allow a jet of fluid to be directed at the area of the break. If desired, controller 38 may activate an alarm to alert the operator that a break has occurred in fibers 18 so that appropriate action may be taken before a major flood occurs on bushing 10. After the necessary steps have been taken by the operator to restart bushing 10, electro-optic sensors 44 may be restarted to scan bushing 10 until the next break occurs.

It is to be understood that variations and modifications of the present invention may be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. A method of controlling the breakage of glass fibers comprising: feeding molten glass through an orificed wall as streams; attenuating the molten glass streams into continuous fibers; determining the specific orifice emitting the stream from which the broken glass fiber was attenuated by means of sensors; thereby preventing breakage of adjacent glass fibers in response to said sensor.

2. A method as recited in claim 1, wherein said break determining step comprises employing two sensors to scan said fibers to determine if a break has occurred therein, and said location determining step comprises determining the positions of said sensors when said sensors detect a break and correlating said positions of said sensors by means of a controller to determine the specific location on said orificed wall of the particular orifice at which the break has occurred.

3. A method as recited in claim 2, wherein said positioning step comprises utilizing the location determined by the controller in said correlating step to control the azimuth and elevation of a nozzle for providing said stream of fluid to freeze off the glass at the specific orifice at which the break occurred.

4. A method as recited in claim 3, wherein said break determining step further comprises positioning said sensors such that said sensors scan said fibers within the range of approximately 1.27 to 7.62 centimeters from the bottom of said orificed wall.

5. An apparatus for controlling the breakage of glass fibers, said apparatus comprising: a feeder for holding a molten body of thermoplastic material, said feeder having an orificed wall for emitting a plurality of streams of said material; a rotary collector for attenuating said streams into continuous fibers and for winding said fibers into a package; a gathering device located between said feeder and collector for gathering said fibers into a strand before being wound into said package; means for scanning said fibers near said orificed wall to determine if a break has occurred in said fibers and to determine the specific location of the orifice which is the source of such break; and means responsive to said scanning means for directing a stream of fluid at said orificed wall at the location of the break to freeze off the glass at that specific orifice to inhibit further breakage of fibers that are adjacent to the location of the break caused by flooding of glass from the orifice at which the break has occurred.

6. An apparatus as recited in claim 5, wherein said scanning means comprises: two movable sensing means for scanning said fibers near said orificed wall to determine if a break has occurred in said fibers, each of said sensing means having position determining means associated therewith for determining the position of its respective sensing means: said fluid directing means comprises movable means for providing a stream of fluid and means associated with said stream providing means and responsive to said position determining means for positioning said stream providing means such that said stream is provided at the specific location of the orifice which is the source of the break; and, control means for converting position determining means of said sensing means into directing means for said fluid means.

7. An apparatus as recited in claim 6, wherein said sensing means are positioned such that said sensing means scan said fibers in a plane located approximately 1.27 to 7.62 centimeters from the bottom of said orificed wall.

8. An apparatus as recited in claim 7, wherein said position determining means are rotary digital encoders and said sensing means are video cameras.

9. An apparatus for controlling the breakage of glass fibers, said apparatus comprising: a feeder for holding a molten body of thermoplastic material, said feeder having an orificed wall for emitting a plurality of streams of said material; a rotary collector for attenuating said streams into continuous fibers and for winding said fibers into a package; a gathering device located between said feeder and collector for gathering said fibers into a strand before being wound into said package; two electro-optic sensing means positioned near opposite ends of said orificed wall for sensing the presence or absence of said fibers, said electro-optic sensing means being movable to enable said electro-optic sensing means to scan said fibers and being positioned such that said electro-optic sensing means scans said fibers in a plane that is approximately 1.27 to 7.62 centimeters from the bottom of said orificed wall; first means associated with said electro-optic sensing means for sensing the position of said electro-optic sensing means; control means associated with said electro-optic sensing means and said first position sensing means for determining when said electro-optic sensing means detect an absence of fibers and for determining the coordinate position of the absence of said fibers; means for providing a jet of fluid, said fluid providing means being movable and having a drive means for moving said fluid providing means and second means for determining the position of said fluid providing means, said fluid providing means, drive means, and second position determining means being connected to said control means, said control means being adapted to actuate said drive means such that said fluid providing means is positioned to provide its jet of fluid at the coordinate position of said absence of fibers and said control means being further adapted to actuate said fluid providing means to enable said fluid providing means to provide its jet of fluid at the coordinate position of said absence of fibers.

* * * * *